UNITED STATES PATENT OFFICE.

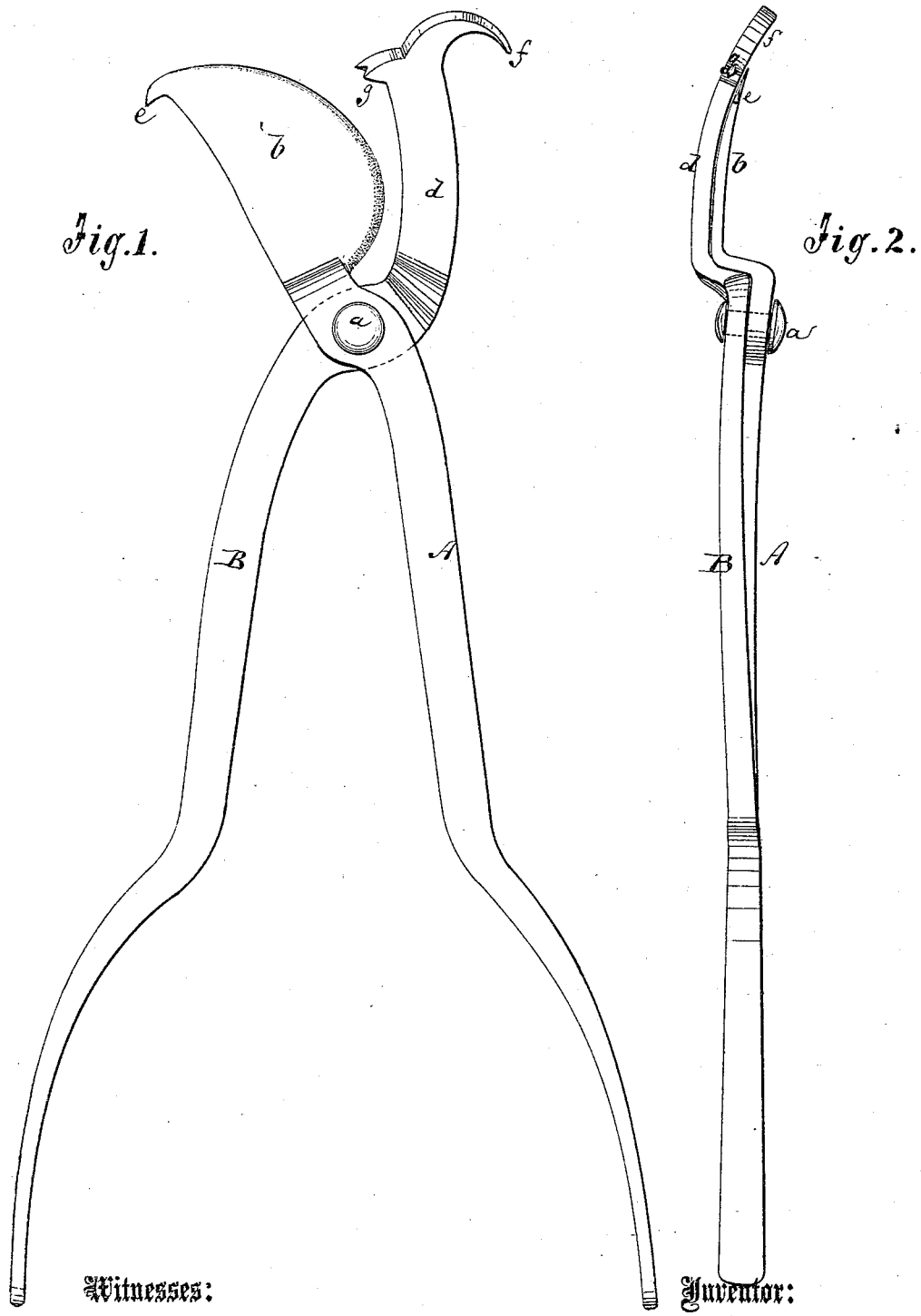

MICAJAH C. MALONE, OF PALMYRA, ILLINOIS.

IMPROVEMENT IN HOOF-SHEARS.

Specification forming part of Letters Patent No. 126,221, dated April 30, 1872.

Specification describing a new and Improved Hoof-Shears, invented by MICAJAH C. MALONE, of Palmyra, in the county of Macoupin and State of Illinois.

Figure 1 represents a face view of my improved hoof-shears. Fig. 2 is an edge view of the same.

Similar letters of reference indicate corresponding parts.

This invention relates to a new instrument for shearing horses' hoofs; and consists in a peculiar shears, having hooks, lugs, and other devices for cleaning, retaining, marking, and cutting the hoof, as hereinafter specified.

A and B are the two handles of the shears, connected by a pivot-pin, $a$. The handle A carries the cutter $b$ of the shears, while the handle B has a hook, $d$, over the face of which the blade $b$ moves to cut. From the blade $b$ projects outwardly a pointed lug, $e$, for marking on the outside of the hoof the line to which the same is to be cut. The hook $d$ carries an outwardly-projecting arm, $f$, for clearing the seam and frog of the hoof. There is also an inwardly-projecting lug, $g$, on the hook $d$. It serves to steady the blade in cutting, and to hold the hook against the portion of the hoof to be cut.

In using, the hook $d$ is placed against the hoof close to where the same is to be cut, and the shears are then plied in the customary manner.

Having thus described my invention, I claim as new and desire to secure by Letters Patent—

The improved implement herein described, consisting of cutter $b$ and hook $d$, provided, respectively, with lugs $e$ and $g$, and formed on or attached to handles B A, as specified.

MICAJAH C. MALONE.

Witnesses:
   JOHN F. CHILES,
   A. C. HULSE.